United States Patent

[11] 3,591,004

| [72] | Inventor | Vernon D. Roosa<br>c/o Hartford Machine Screw Company,<br>P.O. Box 1440, West Hartford, Colo.<br>06601 |
|---|---|---|
| [21] | Appl. No. | 744,413 |
| [22] | Filed | July 12, 1968 |
| [45] | Patented | July 6, 1971 |

[54] FUEL OIL FILTER DESIGN
17 Claims, 5 Drawing Figs.

| [52] | U.S. Cl. | 210/94, 210/233, 210/443 |
|---|---|---|
| [51] | Int. Cl. | B01d 27/06 |
| [50] | Field of Search | 210/94, 232, 233, 443, 445, 451, 453, 493 |

[56] References Cited
UNITED STATES PATENTS

| 1,861,805 | 6/1932 | Lentz | 210/94 |
|---|---|---|---|
| 2,337,469 | 12/1943 | Hill | 210/233 |
| 2,630,919 | 3/1953 | Tyler | 210/233 |
| 2,758,083 | 8/1956 | Van Hoek et al. | 210/23 X |
| 3,025,964 | 3/1962 | Summers et al. | 210/493 |
| 3,062,378 | 11/1962 | Briggs | 210/493 |
| 3,467,256 | 9/1969 | Humbert, Jr. et al. | 210/493 X |

*Primary Examiner*—Samih N. Zaharna
*Attorney*—Prutzman, Hayes, Kalb and Chilton ABSTRACT: A form-sustaining disposable liquid fuel filter cartridge permanently confining a filter element has spaced apart noncoaxial ported resilient abutments on a flat wall of the cartridge housing facing in a common direction to provide a tripod mount for the cartridge and self-adjusting seals for the inlet and outlet passages provided by the ported abutments when the cartridge is mounted on its flat supporting base by a resilient sheet metal spring clamp exerting a biasing force offset from each of the abutments. The rectangular high capacity filter element within the cartridge is accordion pleated and longitudinally corrugated to bias the edges of the element against the walls of the cartridge to which the edges are bonded when the filter element is packed during assembly and to provide enlarged nonclogging entrance openings for the element. Filter elements may be placed in series in a single cartridge for dual filtering of the fuel and an automatically pierced initially sealed ported abutment used to keep contaminants out of the downstream side of the filter element before use.

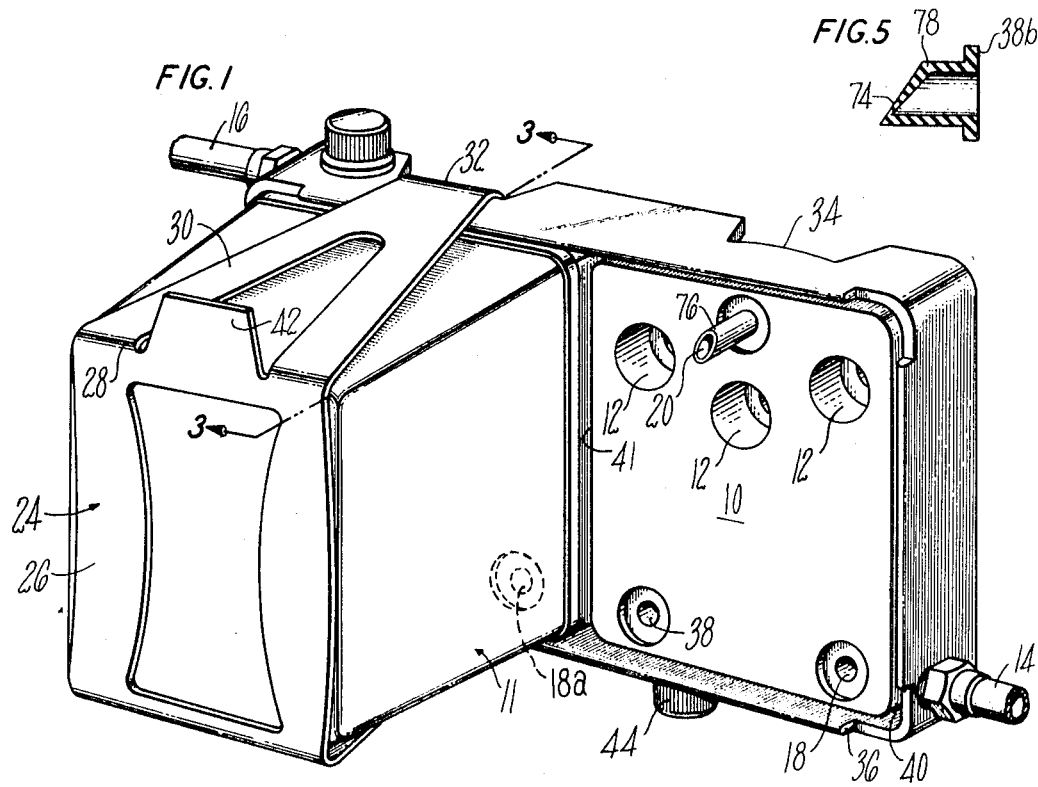
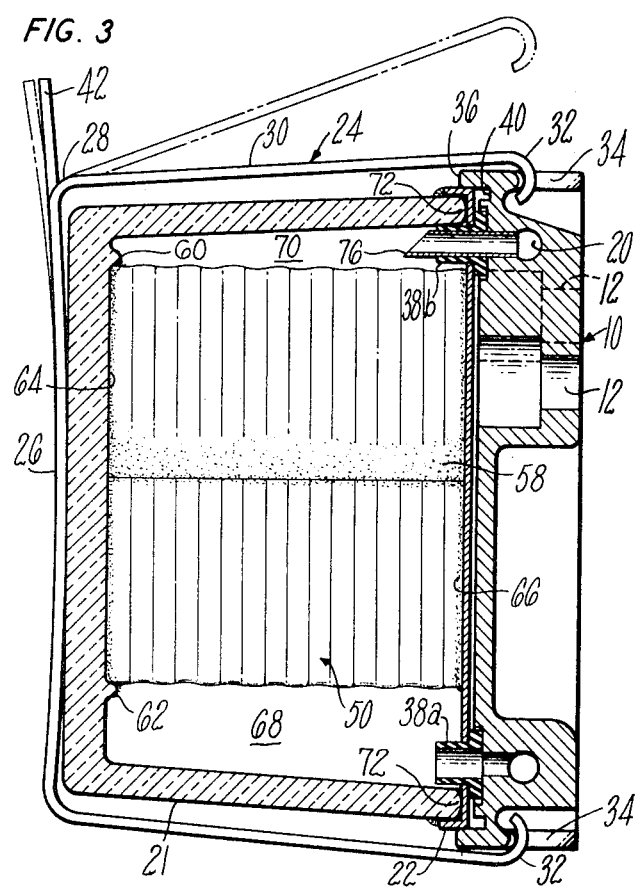
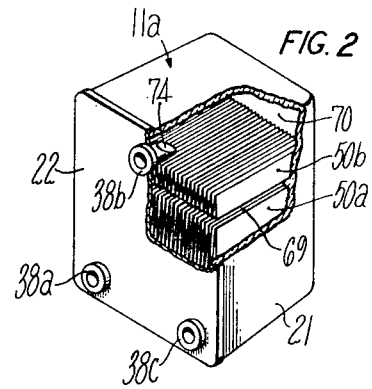
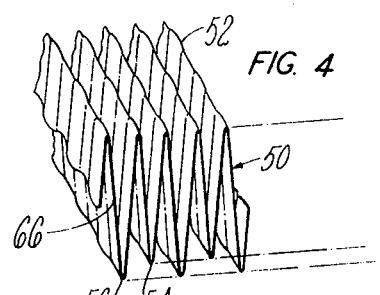
INVENTOR
VERNON D. ROOSA
BY Lindsey, Prutzman and Hayes
ATTORNEYS

FUEL OIL FILTER DESIGN

This invention relates to oil filters and more particularly to a novel economically produced form-sustaining replaceable filter cartridge.

A principal object of the invention is to provide a replaceable cartridge with spaced noncoaxial inlet and outlet ports which are automatically and uniformly sealed during the mounting of the cartridge on its base. Included in this object is the provision of ported abutments incorporating the inlet and outlet ports to provide a tripod mount for a replaceable filter element.

Another object of the invention is to provide a novel filter cartridge which can be assembled on a mounting base by an inexpensive fabricated mounting means which firmly retains the filter element against the base without requiring the use of a threaded connection or auxiliary fasteners to effect the attachment.

A further object of the invention is to provide a novel filter cartridge having a high filter capacity in a relatively small volumetric space. Included in this object is the provision of a novel filter element formed from a single elongated strip of filter paper folded along a series of transverse fold lines to form a series of accordion pleats the edges of which are reliably sealed to the walls of the container of the cartridge.

Another object of this invention is the provision of an accordion pleated filter element having enlarged entrance openings for the oil entering the accordion pleats to minimize the clogging potential of the entrance openings.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the Drawing:

FIG. 1 is a perspective view of a dual element filter assembly embodying the present invention;

FIG. 2 is a bottom perspective view on a reduced scale, partly broken away, of a modified form of a replaceable filter cartridge suitable for use in the filter assembly in FIG. 1;

FIG. 3 is a section view taken along the lines 3–3 of FIG. 1;

FIG. 4 is a fragmentary perspective view, on a reduced scale, of a portion of the accordion pleated filter paper used in the filter cartridge of FIG. 3; and FIG. 5 is an enlarged cross-sectional view of a grommet for the exit port of the filter cartridge of FIG. 2.

FIG. 1 illustrates a filter assembly having a filter base 10 for mounting a pair of filter cartridges 11 in side-by-side relationship with one of the filter cartridges 11 removed for purposes of illustration. Bolt receiving counterbored holes 12 are provided for mounting the base without use of protruding ears. An inlet conduit 14 and an outlet conduit 16 carry oil to and from the filter assembly. An oil passage (not shown) in the base 10, carries the oil from the inlet conduit 14 to the entrance port 18 in the top surface of the base 10. An exit port 20 in the top surface of the base 10 carries the filtered oil through a passage (not shown) which communicates either with the exit conduit 16 or the inlet port 18a of the second filter cartridge 11 depending upon whether the pair of filter cartridges 11 are connected in series or parallel relationship.

The filter cartridges 11 are identical and each comprises a generally rectangular cup-shaped housing 21 sealed by a cover plate 22, which may be formed of sheet metal, and is secured in the allotted place on the base 10 by a clamp 24. Each of the clamps 24 comprise a generally flat bifurcated central portion 26, which spans the closed end of the filter housing 21 with a bifurcated vertical side portion 30 having a finger 32 at each end thereof connected to each end of the central portion 26 by an elbow 28. The clamps 26 are shown as being of a unitary construction formed of a sheet metal having inherent resiliency. The fingers 32 respectively engage arcuately convex bottom walls of notches 34 of the base 10 to provide a biasing force on each filter element balanced along its centerline.

As shown in FIG. 1, the top surface of the base for receiving the filter element 11 is provided with a peripheral wall 36 which is sized so as to closely surround the overlap in telescoping relationship the edges of the cover plate 22 of the filter cartridge. The peripheral wall 36 limits the lateral movement of the cartridge with respect to the base 10.

The inlet and outlet ports 18, 20 respectively, as well as the drain port 38, are shown as being countersunk in the base 10 to receive the mating annular mounting and sealing grommets 38a, 38b and 38c, respectively, so as to assure alignment with the respective ports of the filter cartridge when it is mounted. The filter base is also preferably provided with a peripheral recess 40 and a communicating transverse recess 41 in alignment with the periphery of the cover plate 22 to accommodate any dirt or contaminants which may be present on the base when the filter cartridge is mounted. The recesses 40 and 41 will also accommodate a peripheral bead extending from the cover plate 22 in the event that an axially projecting bead is utilized to seal the cover plate to the open end of the cup-shaped container 21 of the filter cartridge 11.

As best shown by the dashed lines of FIG. 3, the bifurcated central portion 26 of the clamp 24 is concavely bowed when in relaxed position. Desirably and as shown in FIG. 3, a finger piece 42 is provided at one end of the central portion 26 of the clamp 24 to manipulate the clamp and position the fingers 32 in their assembled position with the notch 34 of the base. The clamp 24 exerts a spring biasing force at spaced points on central portions of the closed end of the container for the filter cartridge 11 offset relatively to each of the noncoaxially disposed grommets 38a, 38b and 38c to apply, in the illustrated preferred embodiment, an automatically self-adjusting pressure thereon to seal the same relative to ports 18, 20, 38 respectively during the mounting of the filter cartridge. In effect, by virtue of the tripod mount provided by grommets 38a, 38b and 38c illustrated embodiment, the offset biasing force applied by the clamp 24 automatically and positively seals the fluid connections of the cartridge against leakage regardless of manufacturing variations and tolerances in the filter cartridge and the base without the need for special fasteners or threaded couplings at the fluid connections.

As illustrated, the side portion 30 for the last to be secured finger 32 is disposed, when in relaxed condition, at an angle other than 90° relative to the top surface of the cup-shaped housing. As shown, the relaxed position is such as to hold the finger 32 out of engagement with the notch 34, and to cause it to automatically disengage the notch 34, when finger piece 42 is depressed to replace a filter cartridge. Alternatively, the side portion 30 may be angled, when in relaxed condition, so that it is biased toward the base 10 to automatically latch the finger 32 during the mounting of a new filter cartridge 11.

The port 38 may be connected to a drain opening closed by removable plug 44 by a conduit (not shown) in the base.

In forming the filter element, a sheet of filter medium 50 in strip form (FIG. 4), and having the desired porosity to filter out the undesired contaminants and impurities entrained in the oil, is folded along a series of spaced transverse fold lines 52, 54, 56 to form the strip into a series of accordion pleats with the fold lines 52 on the exit side of the filter element all lying in a common plane. Since the thickness of a folded strip of paper adjacent the fold line is slightly more than twice the unfolded thickness of the paper it is desirable in making a compact filter element to stagger the fold lines formed by the fold lines 54, 56 at the entrance side of the filter to avoid having a restricted entrance susceptible to being clogged by contaminants in the oil being filtered. As shown in FIG. 4, the fold lines 54 are foreshortened relative to fold lines 56 longitudinally of the path of oil therethrough thereby minimizing the susceptibility of the filter to clog at the entrance of the filter element. In the illustrated embodiment of FIG. 4, the foreshortened fold lines 54 are alternated with the longer fold lines 56, with the fold lines 54 and 56 respectively lying substantially in common planes transverse to the path of oil therethrough.

In accordance with another aspect of this invention the strip of filter paper 50 is longitudinally corrugated as shown in FIG. 4. By virtue of this construction, the ridges of the corrugations on each side of the strip of filter paper are aligned with each other when the filter paper is pleated along transverse fold lines 52, 54, 56, and the tops of the ridges engage with each other. Since the valleys of each pleat of the filter paper will also be aligned, it will be apparent that the aligned valleys will provide enlarged entrance openings to further enhance the nonclogging characteristics of the filter element.

With the desired length of strip folded in the form of accordion pleats, a line of adhesive 58 is applied to each end of the strip and the compact filter element is positioned in the rectangular housing formed of the cup-shaped housing 21 and the cover plate or base wall 22 between the locater dams 60, 62 to form inlet chamber 68 and the exit chamber 70 adjacent opposite side walls of the housing 21. The folded longitudinal edges 64, 66 of the strip 50 are respectively sealed by the juxtaposition of these longitudinal edges with a closed bottom wall 23 of the housing 21 and the cover plate 22 by a suitable adhesive to close the ends of the pockets formed by the accordion pleated filter element thereby requiring oil passing through the cartridge to pass through the filter paper. The adhesive 58 also seals the end edges of the strip 50 to opposed walls of the housing 21 to complete the isolation of inlet chamber 68 from exit chamber 70.

By virtue of the longitudinal corrugations of the filter element, the edges of the pleats are biased against the walls of the cup-shaped housing 21 and the cover plate 22 to which it is to be adhered, and assures the sealing of the edges throughout their length.

While different adhesives and different methods of applying the adhesive are within the contemplation of this invention, one such method is to apply a layer of a suitable adhesive, e.g., a thermosetting resin such as epoxy, or a polyvinyl chloride in a dispersion, in the uncured or "B" stage between the dams 60, 62 in the bottom of the cup-shaped housing part 21 and along the edge 66 of the filter paper as well as over the rim or lip 72 of the cup-shaped housing part 21, and, with the parts assembled with the cover plate 22 in place, to apply head to cure the adhesive to seal the edges of the filter element to the walls of the housing 21 and to the cover plate 22, as well as to seal the housing and cover plate together along their peripheral edges.

Where a transparent material, such as a heat resistant glass, is used in making the cup-shaped housing part 21, there is a further advantage that any possible internal defect allowing oil to bypass the filter element may be visually detected during use.

The cylindrical necked portions of grommets 38a, 38b and 38c are inserted in the respective apertures of the cover plate 22 which are disposed inwardly of the opposite side walls of the housing 21 and the grommets are secured thereto as by applying an adhesive thereto.

As shown in FIGS. 2 and 3, the grommets 38a, 38b, 38c as asymmetrically disposed on the cover plate or base wall 22. As is readily apparent from FIG. 2, either the inlet opening provided by grommet 38a or the outlet opening provided by grommet 38b is offset from any axis of symmetry of the base wall 22 so that the cartridge 11a is polarized and may be assembled on the mounting base 10 with only one orientation relative thereto. The grommets 38a, 38b and 38c further provide triangularly disposed bearing portions or abutments for the sealed cartridge facing in a substantially common direction from the cover plate 22. The grommets are of a greater thickness than the depth of the recesses around the ports 18, 20 and 38 of the base respectively to provide a tripod mount for the cartridge 11 assuring that, in the illustrative embodiment, the grommets are subjected to the compressive force of the clamp 24 to seal the inlet and outlet ports of the filter cartridge upon the rectilinear movement of the sealed cartridge 11 toward the base 10 in mounting the cartridge.

A modification of the invention is shown in FIGS. 2 and 5 of the drawing. As shown, the grommet 38b is provided with a sealed end 74 prior to assembly. Since the grommet 38b is ported to provide communication with the exit chamber 70 downstream of the filter element 50 during use, the sealed end 74 which renders the grommet 38b impervious before installation prevents the entry of contaminants into the chamber 70 during storage and transportation prior to use.

The exit port 20 (FIG. 1) of the base 10 is provided with a short upstanding tubular punch 76, the end of which is cut on a bias to provide a sharpened point at its extremity to pierce the closed end 74 of the grommet 38b automatically during assembly. In order to safeguard against the presence of a slug cut from the grommet 38b when the end 74 is pierced by the tubular punch 76, the end 74 is preferably made thicker at its foreshortened side 78 so that the end 74 remains firmly secured to the grommet 38b after the assembly of the filter cartridge 11 on the base. In this way, the cleanliness of the fuel system downstream of the filter element 50 is protected against the introduction of contaminants during the replacement of a filter cartridge 11. It will be readily apparent that grommet 38a, and grommet 38c, could be similarly configured to grommet 38b of FIG. 5 and their associated ports 18 and 38 of base 10 provided with tubular punches similar to punch 76 to pierce their closed ends during assembly. Such a design additionally provides for the sealing of the filter cartridge to the base by virtue of the radial gripping of the tubular punch by the necked portion of the grommet.

FIG. 2 of the drawing shows another modification of the invention wherein the filter cartridge 11a is provided with a pair of serially disposed rectangular pleated filter elements 50a, 50b, separated by an intermediate chamber 69. The filter elements 50a, 50b are each formed in the same manner and of the same filter medium strip as filter element 50 of FIG. 4 except with the dimension of the up stream 50a along the path of oil through the filter cartridge 11a being substantially greater than the corresponding dimension of filter element 50b. Since the upstream filter element 50a collects a percentage of the smallest contaminants desired to be removed from the oil and filter element 50b removes a percentage of such contaminants remaining after passage of the oil through element 50a, it is apparent that the downstream filter element 50b may have a substantially smaller capacity than filter element 50a to remove the desired portion of such contaminants from the oil downstream of the filter. Accordingly, the filter capacities of elements 50a and element 50b may be adjusted by proportioning the quantity of filter medium contained in the two elements so that both of the filter elements will be simultaneously loaded to their capacity with contaminants.

The use of two filter elements in series in one self-contained replaceable housing 11a as illustrated in FIG. 2 is additionally advantageous should any nonuniformity in the porosity of the filter medium strip used in making filter element 50a permit the passage of some particles of contaminants of a size larger than desired.

From the foregoing, it is apparent that this invention provides a unique high quality, form-sustaining replaceable filter cartridge which can be manufactured without precision machining operations and with generous manufacturing tolerances and which may be easily and quickly assembled as a sealed unit by rectilinear movement toward its supporting base with assurance against leakage and easy removal without the use of critical assembly torques. In the preferred embodiment illustrated, a tripod mount is provided by ported sealing grommets noncoaxially disposed in a flat wall of the sealed housing with the ports serving as an inlet and an outlet for the fuel being filtered.

It is also apparent that this invention provides a filter cartridge of high filtering capacity in a small volumetric space and provides a filter element having high nonclogging characteristics and positive safeguards against the presence of nonfiltered oil downstream of the filter cartridge, and may be used in a filter assembly having a base for mounting a single filter cartridge.

As will be apparent to persons skilled in the art, modifications and adaptations of the structure above-described will become readily apparent without departure from the spirit and scope of the invention, the scope of which is defined in the appended claims.

I claim:

1. A disposable form-sustaining liquid filter cartridge suited for installation on a supporting base comprising a closed housing and a liquid permeable filter element within the housing and dividing the interior thereof into an inlet chamber and an outlet chamber, said housing having a base wall overlying the ends of said inlet chamber and said outlet chamber, said base wall providing abutment means having triangularly disposed bearing portions engageable with the supporting base and effecting lateral stability of said cartridge thereon, said abutment means defining preformed ports to provide communication with said inlet chamber and said outlet chamber respectively.

2. A filter cartridge as recited in claim 1 wherein the abutment means forms seals surrounding the ports.

3. A filter cartridge as recited in claim 1 wherein the filter element comprises a manifold pleated longitudinally corrugated filter strip with the fold lines thereof extending transversely of the corrugations.

4. A filter cartridge as recited in claim 3 wherein alternate fold lines on the upstream side of the filter element are foreshortened to extend a different distance in the direction of liquid flow.

5. A filter cartridge as recited in claim 3 wherein the pleated filter element is compacted in the housing to bias the edges of the pleats against the sidewalls of the housing.

6. A filter cartridge as recited in claim 3 wherein the edges of the pleats are adhered to the sidewalls of the housing.

7. A filter cartridge as recited in claim 6 wherein the housing is transparent for the detection of leakage paths through the filter element in use.

8. A filter cartridge as recited in claim 1 wherein the filter element comprises a pair of serially disposed pleated sections defining an intermediate chamber therebetween.

9. A device as recited in claim 1 including a mating base for the filter cartridge and a spring clamping means exerting the biasing force in a common direction offset from said bearing portions to automatically align the filter cartridge in sealing engagement with the base during assembly.

10. A device as recited in claim 9 wherein the biasing spring spans the filter housing and is provided with the depending legs releasably engageable with the base.

11. A device as recited in claim 10 wherein the portion of the spring engaging the housing is bifurcated and concave when in its relaxed position.

12. A base-mounted generally rectangular liquid filter cartridge assembly comprising a transparent housing and a liquid permeable filter element confined within the housing and dividing the interior thereof into an inlet chamber and an outlet chamber respectively disposed adjacent opposite sidewalls of the housing, the housing including a base wall spanning the sidewalls and overlying the ends of the inlet chamber and the outlet chamber, the base wall being ported inwardly of said sidewalls to provide ports for the inlet and outlet chambers, the housing further providing resilient seals about the periphery of the ports automatically sealing the ports upon rectilinear movement of the cartridge in mounting the same, the port communicating with the outlet chamber being liquid impervious prior to use, a mounting base provided with a punch to automatically pierce the seal of said port for said outlet chamber during assembly on the base, and a biasing spring spanning the filter housing and provided with depending legs releasably engageable with said base, the portion of said biasing spring engaging the housing being bifurcated and concave when in its relaxed position.

13. A disposable form sustaining liquid filter cartridge suited for mounting on a supporting base comprising a closed housing and a liquid permeable filter element within the housing and dividing the interior thereof into an inlet chamber and an outlet chamber, said housing comprising an outer wall and a base wall, sidewalls interposed between said outer and base walls, spaced preformed openings in said base wall, the first of said openings connecting with said inlet chamber and the second of said openings connecting with said outlet chamber, at least one of said first and second openings being offset from any axis of symmetry of said base wall to polarize said cartridge.

14. The filter cartridge of claim 13 wherein said inlet chamber and said outlet chamber are each adjacent said sidewalls on opposite sides of said filter element.

15. The filter cartridge of claim 13 wherein a third opening is provided in said base wall for communication with said inlet chamber.

16. A filter cartridge as defined in claim 1 wherein said inlet chamber and said outlet chamber are each disposed adjacent the sidewalls of said cartridge.

17. A filter cartridge as defined in claim 1 wherein said bearing portions are discontinuous and comprise resilient grommets projecting from said base wall.